US009379575B2

(12) United States Patent
Higashi

(10) Patent No.: US 9,379,575 B2
(45) Date of Patent: Jun. 28, 2016

(54) BATTERY CHARGER NOISE REDUCTION BY FREQUENCY SWITCHING

(71) Applicant: Nissan North America, Inc., Franklin, TN (US)

(72) Inventor: Kazuyuki Higashi, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 148 days.

(21) Appl. No.: 14/200,967

(22) Filed: Mar. 7, 2014

(65) Prior Publication Data

US 2015/0256024 A1 Sep. 10, 2015

(51) Int. Cl.
| | |
|---|---|
| H02J 7/00 | (2006.01) |
| H02J 7/04 | (2006.01) |
| B60L 11/18 | (2006.01) |
| H01M 10/44 | (2006.01) |
| H02M 1/00 | (2006.01) |

(52) U.S. Cl.
CPC ............ *H02J 7/042* (2013.01); *B60L 11/1811* (2013.01); *H01M 10/44* (2013.01); *H02J 7/0052* (2013.01); *H02J 7/041* (2013.01); *H02J 7/047* (2013.01); *H02M 1/00* (2013.01); *B60L 2210/30* (2013.01); *B60L 2270/147* (2013.01)

(58) Field of Classification Search
CPC ......... H02J 7/042; H02J 7/0052; H02J 7/041; H02J 7/047; H02M 1/00; B60L 2210/30; B60L 2270/147; H01M 10/44
USPC .......................................... 326/155, 150, 144
See application file for complete search history.

(56) References Cited

U.S. PATENT DOCUMENTS

| | | | | |
|---|---|---|---|---|
| 4,387,332 A | * | 6/1983 | Oyamada ............... | H02J 7/0024 320/124 |
| 4,835,409 A | * | 5/1989 | Bhagwat ................ | A47L 9/2805 15/DIG. 1 |
| 5,790,391 A | * | 8/1998 | Stich ....................... | H02J 9/062 307/64 |
| 6,115,276 A | * | 9/2000 | Mao ........................ | H02J 9/062 363/127 |

(Continued)

FOREIGN PATENT DOCUMENTS

| | | |
|---|---|---|
| EP | 0483894 A1 | 5/1992 |
| JP | 2002338197 A | 11/2002 |

(Continued)

OTHER PUBLICATIONS

Huber, L., Jovanovic, M.; "Methods of Reducing Audible Noise Caused by Magnetic Components in Variable-Frequency-Controlled Switch-Mode Converters", IEEE Transactions on Power Electronics, vol. 26, No. 6, Jun. 2011, pp. 1673-1681.

(Continued)

*Primary Examiner* — Phallaka Kik
(74) *Attorney, Agent, or Firm* — Young Basile Hanlon & MacFarlane P.C.

(57) ABSTRACT

A method of charging a battery in a charging system having a power convertor that coverts AC electrical power to DC electrical power includes operating the power convertor at a first frequency during a first charging phase of the charging system; ending the first charging phase upon determining that a predetermined criterion is satisfied; and subsequent to ending the first charging phase, operating the power convertor at a second frequency during a second charging phase of the charging system, wherein the first frequency is different than the second frequency.

11 Claims, 6 Drawing Sheets

(56) References Cited

U.S. PATENT DOCUMENTS

| | | | |
|---|---|---|---|
| 6,154,473 A * | 11/2000 | Watanabe | H01S 3/092 323/237 |
| 7,696,714 B2 | 4/2010 | Sterk | |
| 8,643,330 B2 | 2/2014 | Nergaard et al. | |
| 9,106,088 B2 * | 8/2015 | Kondo | H02J 5/005 |
| 9,231,481 B2 * | 1/2016 | Wallis | H02J 7/0044 |
| 9,270,122 B2 * | 2/2016 | Stoger | H05B 33/0815 |
| 9,318,969 B2 * | 4/2016 | Dillig | H02M 5/458 |
| 2008/0013351 A1 * | 1/2008 | Alexander | H02M 3/1582 363/123 |
| 2009/0184681 A1 | 7/2009 | Kuno | |
| 2010/0102642 A1 | 4/2010 | Odaohhara et al. | |
| 2011/0031930 A1 * | 2/2011 | Kajouke | H02M 3/33584 320/128 |
| 2011/0095727 A1 * | 4/2011 | Yeh | H02J 9/062 320/138 |
| 2011/0172859 A1 | 7/2011 | Sankaran et al. | |
| 2011/0198936 A1 * | 8/2011 | Graovac | H02M 7/79 307/82 |
| 2011/0210702 A1 * | 9/2011 | Shimayama | H02J 7/35 320/134 |
| 2011/0292697 A1 * | 12/2011 | Alexander | H02M 5/275 363/37 |
| 2012/0026771 A1 | 2/2012 | Imura et al. | |
| 2012/0097856 A1 * | 4/2012 | Chappo | G01T 1/2018 250/363.01 |
| 2012/0176820 A1 * | 7/2012 | Li | H02M 3/33507 363/21.12 |
| 2012/0313612 A1 * | 12/2012 | Schneider | G05F 1/67 323/311 |
| 2013/0026955 A1 | 1/2013 | Kikunaga et al. | |
| 2013/0049666 A1 * | 2/2013 | Osugi | H02P 27/08 318/503 |
| 2013/0057170 A1 * | 3/2013 | Altheimer | H02M 1/4208 315/200 R |
| 2013/0057209 A1 | 3/2013 | Nergaard et al. | |
| 2013/0144477 A1 | 6/2013 | Yamada et al. | |
| 2014/0003099 A1 * | 1/2014 | Dillig | H02M 5/458 363/37 |
| 2014/0091754 A1 * | 4/2014 | Shum | H02J 7/0057 320/107 |
| 2014/0159776 A1 * | 6/2014 | Elran | H03K 3/011 327/102 |
| 2014/0160800 A1 * | 6/2014 | Zimmanck | H02M 3/3376 363/17 |
| 2014/0217964 A1 * | 8/2014 | Fujimoto | H02M 7/219 320/107 |
| 2014/0312828 A1 * | 10/2014 | Vo | H01M 10/4257 320/103 |
| 2014/0340031 A1 * | 11/2014 | Mi | H02J 7/025 320/108 |
| 2014/0346868 A1 * | 11/2014 | Kuznetsov | H02J 4/00 307/18 |
| 2015/0109000 A1 * | 4/2015 | Sieber | G01B 7/003 324/655 |
| 2016/0072400 A1 * | 3/2016 | Alexander | H02M 3/1582 363/35 |

FOREIGN PATENT DOCUMENTS

| | | | | |
|---|---|---|---|---|
| JP | 2004048844 A | | 2/2004 | |
| JP | 2005130614 A | | 5/2005 | |
| JP | 2006333572 A | | 12/2006 | |
| JP | 2009219252 A | * | 9/2009 | H01J 9/06 |
| JP | 2009303288 A | | 12/2009 | |

OTHER PUBLICATIONS

Noro, M., Koizumi, S.; "Present Application and Future Possibilities of Quick Charger for Electric Vehicle", SAE International by Nissan Motor Co Ltd., May 17, 2011, Paper #2011-39-7250.

* cited by examiner

BATTERY CHARGER NOISE REDUCTION BY FREQUENCY SWITCHING

BACKGROUND

Rechargeable batteries are used for many purposes. As one example, electric vehicles are becoming common. Electric vehicles commonly include rechargeable battery packs that are charged when the vehicle is not in use.

Battery chargers are utilized to recharge batteries to restore electrical power that has been depleted during use. For certain applications, such as charging electric vehicles, quick charging systems are used to quickly charge rechargeable batteries. As an example, if the charging time for an electric vehicle is 12-16 hours using a 120 volt AC charger or 6-8 hours using a 240 volt AC charger, the same vehicle could be charged in as little as thirty minutes using a 480 volt (Direct Current) DC quick charger. A typical DC quick charger includes a power convertor that converts AC power to DC power. This can be done, in part, using magnetic switching components. When operated, however, these components can generate significant levels of audible noise. With respect to applications such as electric vehicles, these chargers will often be located in public places where high noise levels may not be acceptable.

SUMMARY

The disclosure relates to systems and methods for reducing audible noise associated with battery chargers.

One aspect of the disclosed embodiments is a method of charging a battery in a charging system having a power convertor that coverts AC electrical power to DC electrical power. The method includes operating the power convertor at a first frequency during a first charging phase of the charging system; ending the first charging phase upon determining that a predetermined criterion is satisfied; and subsequent to ending the first charging phase, operating the power convertor at a second frequency during a second charging phase of the charging system, wherein the first frequency is different than the second frequency.

Another aspect of the disclosed embodiments is a method of charging a battery in a charging system having a power convertor that coverts AC electrical power to DC electrical power. The method includes operating the power convertor at a first frequency during a first charging phase of the charging system; monitoring a power output value of the power convertor during the first charging phase of the charging system; ending the first charging phase upon determining that the power output value of the power convertor has dropped below a threshold value; and subsequent to ending the first charging phase, operating the power convertor at a second frequency during a second charging phase of the charging system, wherein the first frequency is different than the second frequency.

Another aspect of the disclosed embodiments is a method of charging a battery in a charging system having a power convertor that coverts AC electrical power to DC electrical power. The method includes operating the power convertor at a first frequency during a first charging phase of the charging system; monitoring an elapsed time value measured from the time at which the first charging phase commences; ending the first charging phase upon determining the elapsed time value has reached a threshold value; and subsequent to ending the first charging phase, operating the power convertor at a second frequency during a second charging phase of the charging system, wherein the first frequency is different than the second frequency.

BRIEF DESCRIPTION OF THE DRAWINGS

The description herein makes reference to the accompanying drawings wherein like reference numerals refer to like parts throughout the several views, and wherein.

DETAILED DESCRIPTION

In a battery charging system having a power convertor that coverts AC electrical power to DC electrical power, the amount of audible noise produced varies during a charging operation. In particular, the amount of noise energy generated is proportional to the amount of power that is being supplied by the charger, which reaches a highest level early in the charging operation before gradually decreasing. The battery charging system includes magnetic switching components that operate at a frequency, and the amount of audible noise generated is further dependent on the frequency. Typically, the battery charging system will operate at a frequency that is referred to herein as a carrier frequency, which is an optimal frequency for operation of the power convertor of the battery charging system. Operating at frequencies lower than the carrier frequency will result in magnetic saturation of the switching components. Operating at frequencies higher than the carrier frequency will result in excess heat generation and possible overheating. The carrier frequency, however, is associated with a higher level of noise generation as compared to surrounding frequencies.

In the systems and methods described herein, the audible noise generated by a charging system is reduced by operating the power convertor at a first frequency during a first charging phase of the charging system, and operating the power convertor at a second frequency during a second charging phase of the charging system. Thus, at the start of the charging operation when audible noise levels are highest, a frequency that reduces audible noise generation can be utilized, but later switched to a different frequency to avoid prolonged operation at a frequency that could cause magnetic saturation issues or heat issues.

Figure 1:
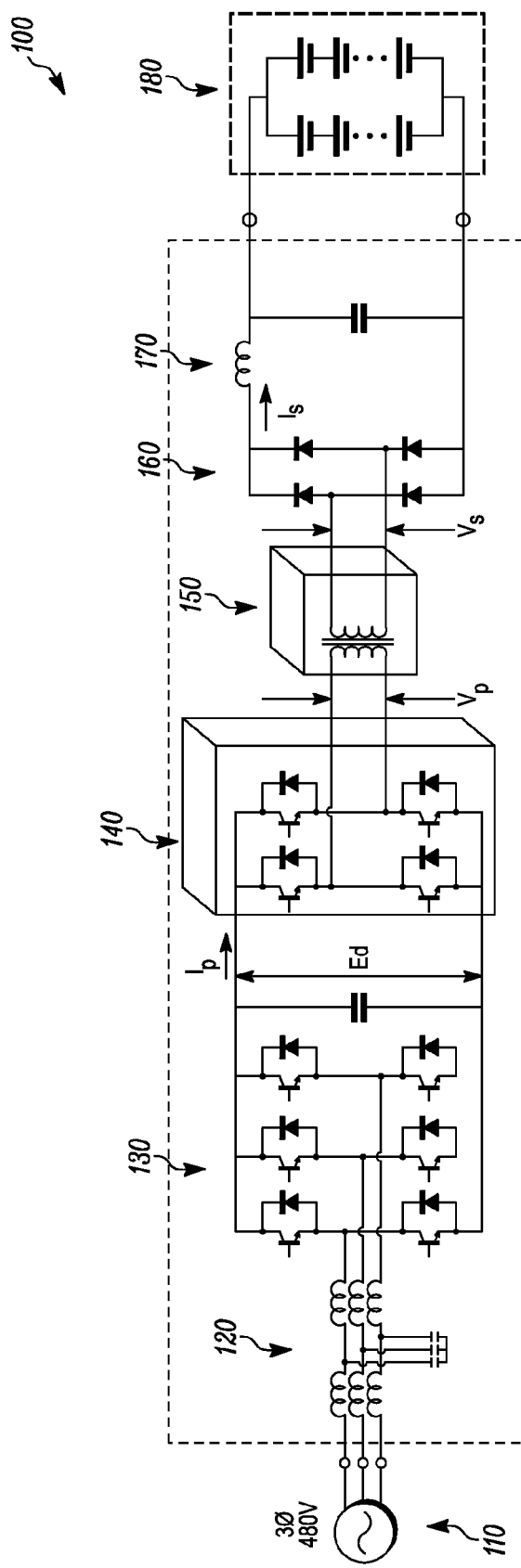
FIG. 1 is an illustration showing a battery charging system having a power convertor.

FIG. 1 shows a battery charging system 100 with which the systems and methods disclosed herein can be implemented. The battery charging system 100 can receive electrical power from a power source 110, such as three-phase AC power source at 480 volts. As an output, the battery charging system 100 supplies a regulated supply of DC electrical power to a battery, such as an electric vehicle battery 180. The battery charging system 100 can be of any suitable configuration. In the illustrated example, the battery charging system 100 includes an AC reactor 120, an inverter 130, a power convertor 140, a transformer 150, a rectifier 160, and a ripple suppressor 170.

Figure 2:
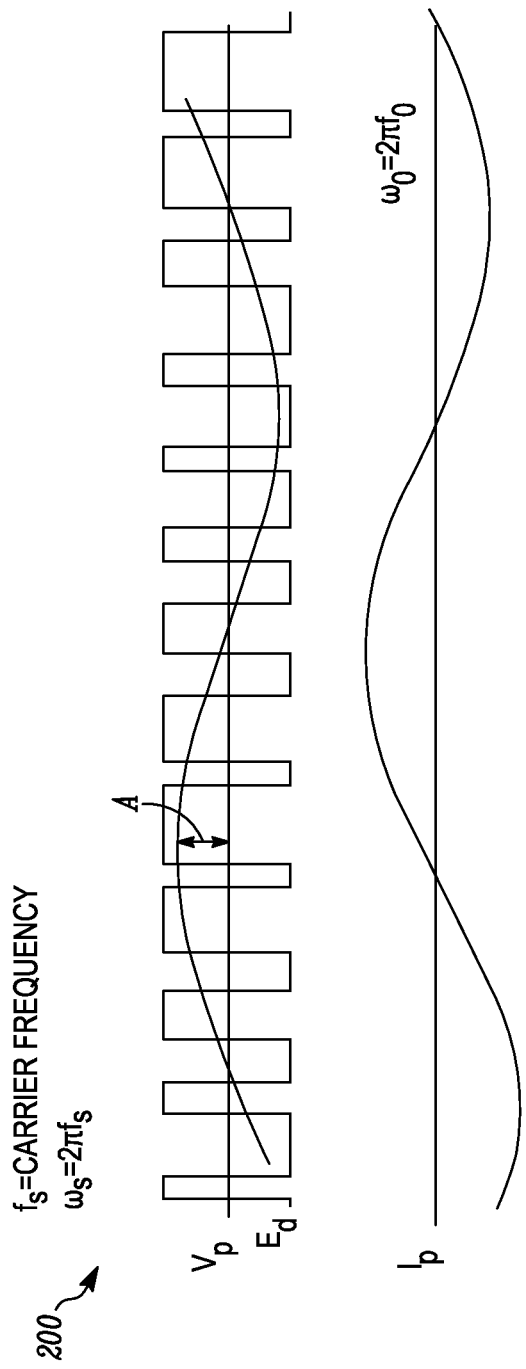
FIG. 2 is an illustration showing a carrier signal by which the power convertor is operated.

The power convertor 140 includes magnetic switching components that control conversion of the AC power to DC power, and are operated according to a carrier signal 200, as shown in FIG. 2. The carrier signal 200 has a frequency $f_S$ (i.e. the carrier frequency), and an amplitude A.

Figure 3:
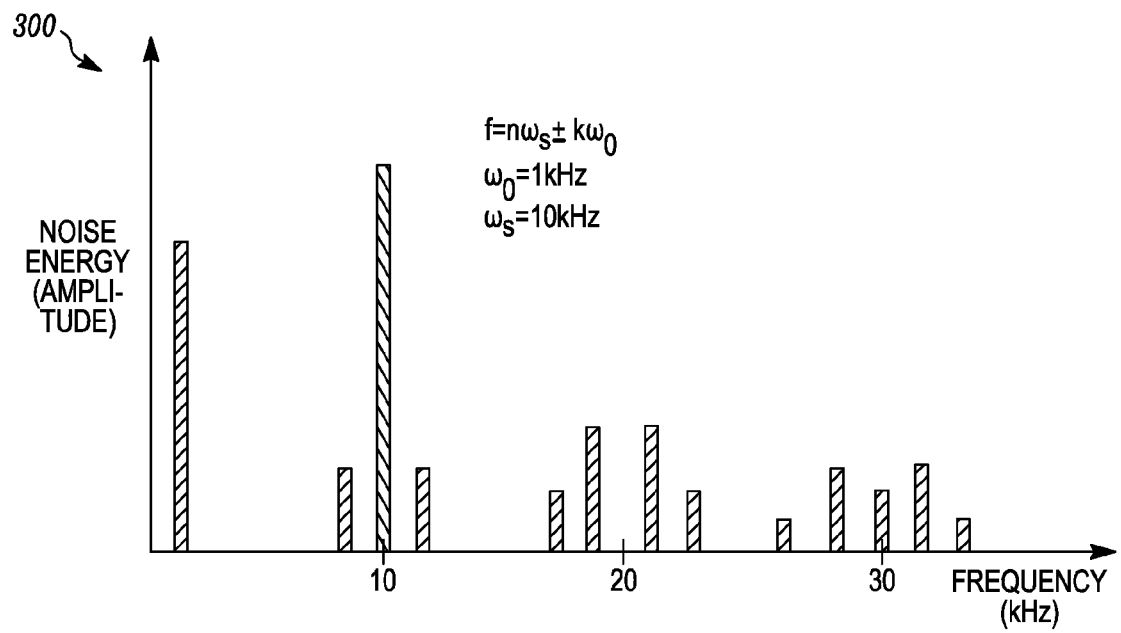
FIG. 3 is a graph showing a relationship between the carrier frequency and the noise energy produced by the power convertor.

FIG. 3 is a graph 300 that demonstrates a relationship between the frequency of the carrier signal 200 and the noise energy produced by the power convertor 140. The noise energy produced by the power convertor 140 is dependent upon the frequency at which the convertor is operated. At the carrier frequency, which in the illustration is 10 kHz, the noise energy is much greater than at surrounding frequencies. Prolonged operation of the power convertor 140 other than at the carrier frequency, however, can be detrimental to the power convertor. In particular, prolonged operation above the carrier frequency is associated with excessive heat generation, and prolonged operation below the carrier frequency can lead to magnetic saturation.

Figure 4:
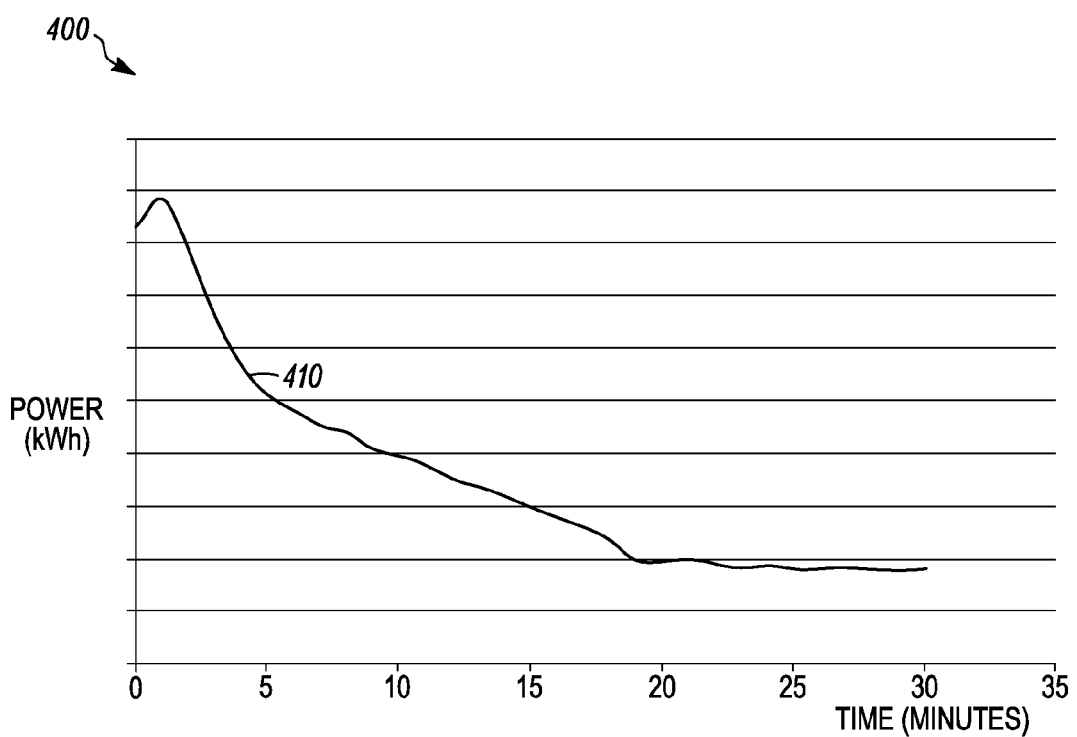
FIG. 4 is a graph showing the power output of the battery charging system with respect to time during a battery charging operation.

FIG. 4 is a graph 400 depicting a relationship 410 of the amount of power supplied by the battery charger over time during the battery charging operation. Typically, the amount of power being supplied reaches a maximum value early in the charging cycle, such as within two minutes in the illustrated example of a charging operation lasting approximately thirty minutes. Subsequently, the amount of power being supplied decreases over time, and reaches a minimum value near the end of the charging cycle.

Figure 5:
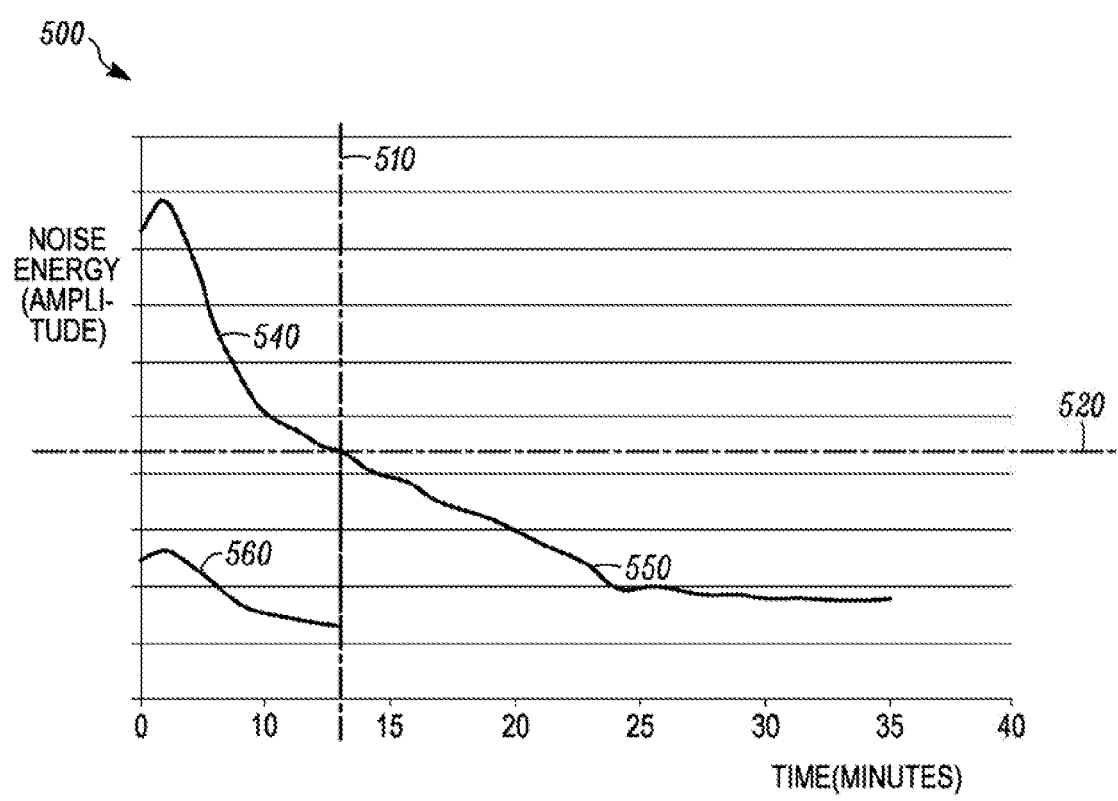
FIG. 5 is a graph showing noise energy produced by the power convertor with respect to time during the charging operation.

FIG. 5 is a graph 500 depicting an example of a relationship of the amount of noise energy produced over time during the charging operation. The amount of noise energy generated by the magnetic switching components of the power convertor is proportional to the amount of power supplied, and is further dependent on the frequency at which the switching components of the power convertor are operated. As shown in the graph 500, the charging operation includes a first charging phase and a second charging phase. The first charging phase is prior to a first time point 510, where the voltage values are above a first voltage value 520 (with voltage being proportional to noise energy). The noise energy produced by the convertor, when operated at the carrier frequency during the first phase of the charging operation and during the second phase of the charging operation, is represented by a first curve portion 540 prior to the first time point 510 and by a second curve portion 550 subsequent to the first time point 510. Thus, in the illustrated example, at the carrier frequency wherein the first curve portion 540 and the second curve portion 550 are generally proportional to the power supplied by the battery charging system 100 throughout the charging operation.

The amount of audible noise generated by the battery charging system 100 can be reduced by operating the power convertor 140 at a frequency that is different than the normal carrier frequency during the first charging phase, then changing the frequency for the second charging phase of the charging operation. By changing operating at a different frequency during the first charging phase, the highest levels of noise energy that would otherwise be produced are avoided. By subsequently changing the frequency to the normal carrier frequency, the adverse effects associated with prolonged operation above or below the normal carrier frequency are avoided. During each of the first charging phase and the second charging phase of the charging operation, however, the frequency at which the power convertor 140 of the battery charging system 100 is operated can remain substantially constant (e.g. intended to be constant but subject to fluctuations that occur during normal operation).

As seen in FIG. 5, a third curve portion 560, which extends from the beginning of the charging operation to the first time point 510, represents noise energy generated by the power convertor 140 of the battery charging system 100 when operated at a frequency other than the normal carrier frequency. As shown by comparison of the third curve portion 560 to the first curve portion 540, at the same power output values, operation of the power convertor 140 of the battery charging system 100 at the frequency associated with the third curve portion 560 causes audible noise at a lower level than operation of the power convertor 140 of the battery charging system 100 at the normal carrier frequency associated with the first curve portion 540.

As an example, the noise levels represented by the first curve portion 540 and the second curve portion 550 could correspond to operation at 10 kHz, while the noise level represented by the third curve portion 560 could represent operation at 15 kHz. In some implementations the frequency corresponding to the third curve portion 560 is higher than the normal carrier frequency. In other implementations the frequency corresponding to the third curve portion 560 is lower than the normal carrier frequency. In some implementations the frequency corresponding to the third curve portion 560 is at least one of 20 percent higher or 20 percent lower than the normal carrier frequency. In other implementations the frequency corresponding to the third curve portion 560 is at least one of 50 percent higher or 50 percent lower than the normal carrier frequency.

Transition from the first charging phase to the second charging phase can occur in response to any of several predetermined criteria. As one example, the power output of the battery charging system 100 is monitored or estimated, and the first charging phase is ended and the second charging phase begins in response to determining that the power output has fallen below a threshold value. As another example, the elapsed time since the beginning of the charging operation is monitored or estimated, and the first charging phase is ended and the second charging phase begins in response to determining that a predetermined amount of time has passed (i.e. the elapsed time has exceeded a threshold value). As another example, the temperature of the switching components of the power convertor 140 of the battery charging system 100 is monitored or estimated, and the first charging phase is ended and the second charging phase begins in response to determining that the temperature has exceeded a threshold value. As another example, the temperature of the switching components of the power convertor 140 of the battery charging system 100 is monitored or estimated, and the first charging phase is ended and the second charging phase begins in response to determining that the temperature has exceeded a threshold value. As another example, the temperature of the switching components of the power convertor 140 of the battery charging system 100 is monitored or estimated, and the first charging phase is ended and the second charging phase begins in response to determining that the temperature has exceeded a threshold value. As another example, the magnetic saturation of the switching components of the power convertor 140 of the battery charging system 100 is monitored or estimated, and the first charging phase is ended and the second charging phase begins in response to determining that the magnetic saturation has exceeded a threshold value. As another example, the noise energy generated by the switching components of the power convertor 140 of the battery charging system 100 is monitored or estimated, and the first charging phase is ended and the second charging phase begins in response to determining that the noise energy has dropped below a threshold value.

Figure 6:
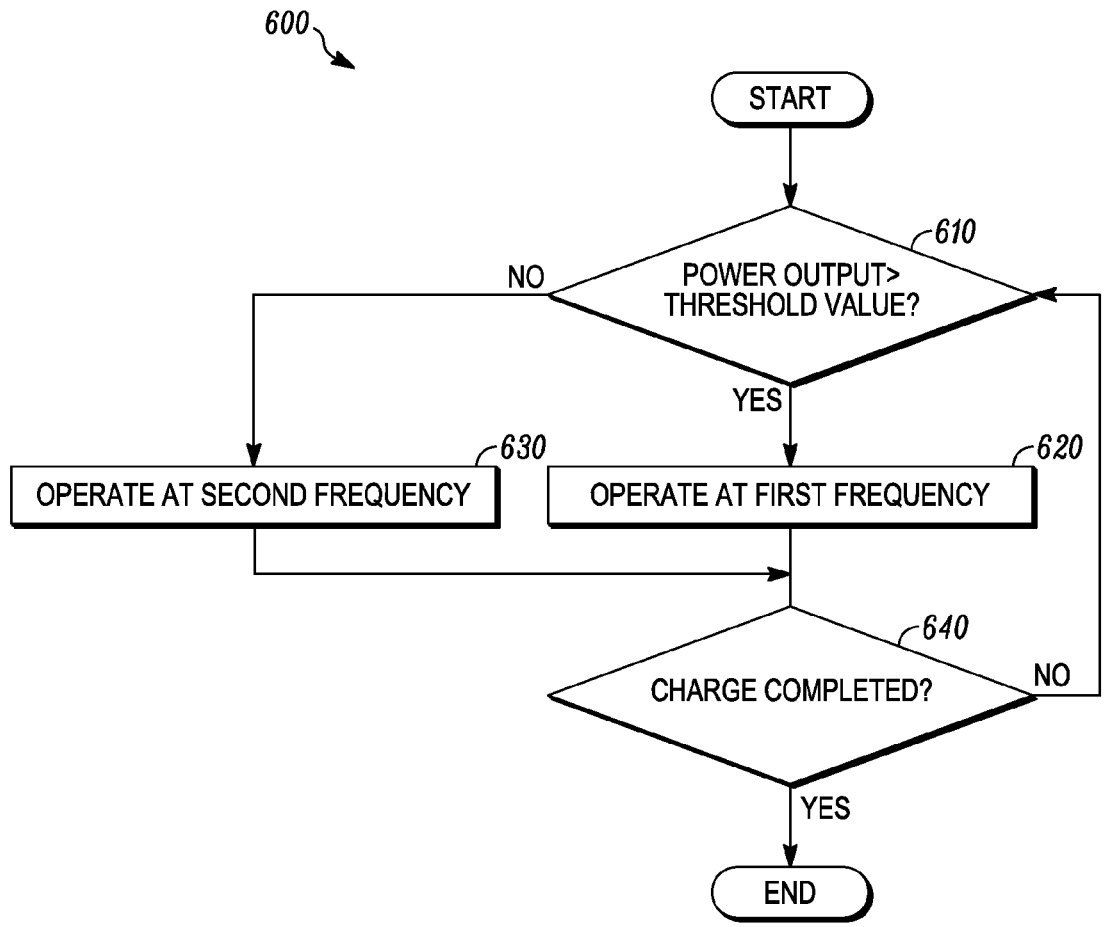
FIG. 6 is a flowchart showing an example of a process for charging a battery using the battery charging system.

FIG. 6 is a flowchart showing an example of a process 600 for charging a battery in a battery charging system having a power convertor that coverts AC electrical power to DC electrical power. The process 600 can be practiced, for example, using the battery charging system 100.

Initially a first charging phase commences, with the battery charging system 100 being operated at a first frequency that is associated with generation of audible noise at a lower level than at a second frequency, which can be the normal carrier frequency for the battery charging system 100, as previously explained. At operation 610, a predetermined characteristic such as power output is monitored and a determination is made as to whether the predetermined criterion is satisfied. For example, a determination can be made as to where the power output of the battery charging system 100 is compared to a threshold value. If the power output is greater than the threshold value, the predetermined criterion is not satisfied, and the process continues to operation 620, where operation of the power convertor 140 of the battery charging system 100 is continued at the first frequency. If the power output is less than the threshold value, the predetermined criterion is satisfied, and the process continues to operation 630, where the first charging phase ends, and the second charging phase commences with operation of the power convertor 140 of the battery charging system 100 at the second frequency. At operation 640, a determination is made as to whether the charging operation is completed. This can be determined, for example, based on factors such as a state-of-charge of a battery, such as the electric vehicle battery 180, or the elapsed time of the charging operation. If the charging operation is completed, the process 600 ends. If the charging operation is not completed, the process returns to operation 610.

Figure 7:
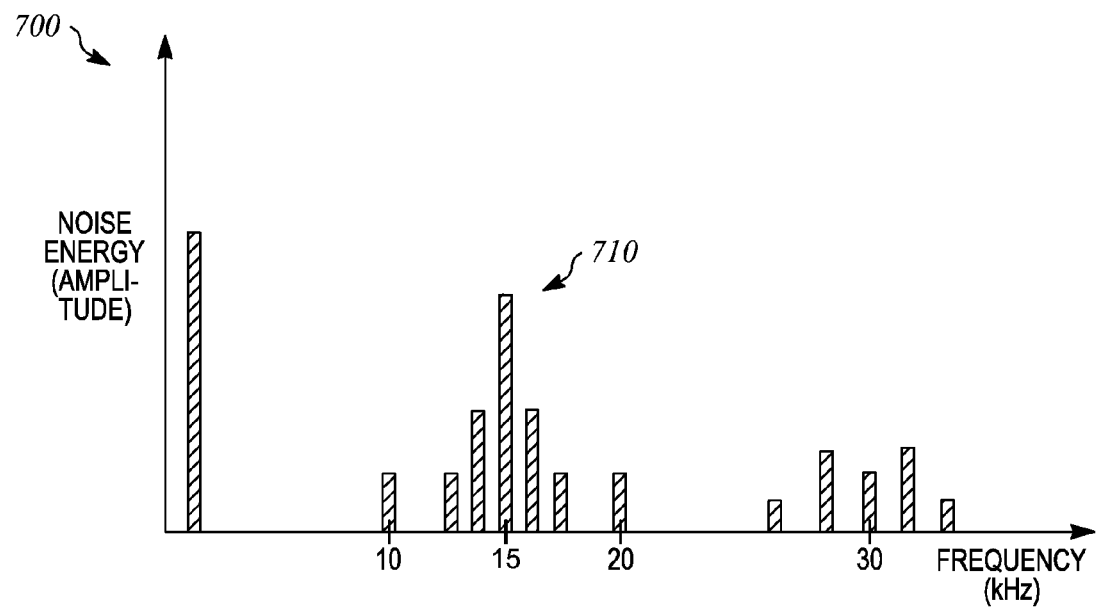
FIG. 7 is a graph showing peak noise energy produced by the power convertor during a first charging phase.
Figure 8:
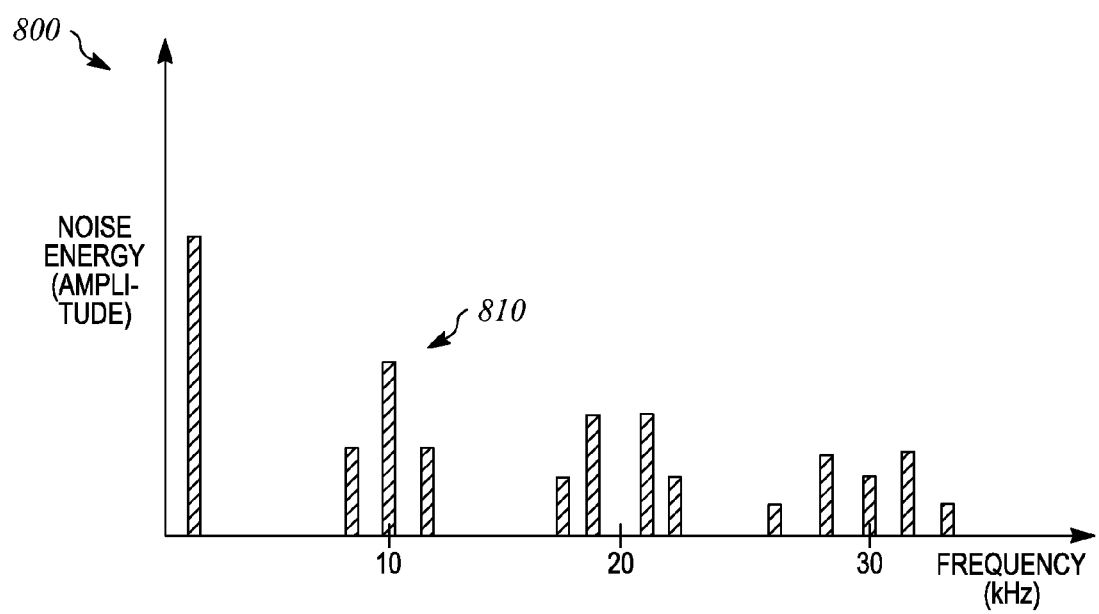
FIG. 8 is a graph showing peak noise energy produced by the power convertor during a first charging phase.

FIG. 7 is a graph 700 showing noise energy produced during the first charging phase including a peak value 710 at 15 kHz. FIG. 8 is a graph 800 showing noise energy produced during the second charging phase including a peak value 810 at 10 kHz. As will be appreciated by comparison to operation at the normal carrier frequency, as shown in FIG. 3, operation of the battery charging system according to the process 600 can reduce the overall amount of audible noise generated by the battery charging system 100.

While the description herein is made with respect to specific implementations, it is to be understood that the invention is not to be limited to the disclosed implementations but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of charging a battery in a charging system having a power convertor that converts AC electrical power to DC electrical power, the method comprising:
    operating the power convertor at a first frequency during a first charging phase of the charging system;
    monitoring a power output value of the power convertor during the first charging phase, wherein a predetermined criterion is satisfied when the power output value drops below a threshold power output value;
    ending the first charging phase upon determining that the predetermined criterion is satisfied; and
    subsequent to ending the first charging phase, operating the power convertor at a second frequency during a second charging phase of the charging system, wherein the first frequency is different than the second frequency, and operation of the power convertor the first frequency at a first power output value causes audible noise at a lower level than operation of the power convertor at the second frequency at the threshold power output value.

2. The method of claim 1, wherein the first frequency is at least one of 20 percent higher or 20 percent lower than the second frequency.

3. The method of claim 1, wherein the first frequency is at least one of 50 percent higher or 50 percent lower than the second frequency.

4. The method of claim 1, wherein the first frequency is higher than the second frequency.

5. The method of claim 1, wherein the first frequency is lower than the second frequency.

6. A method of charging a battery in a charging system having a power convertor that converts AC electrical power to DC electrical power, the method comprising:
    operating the power convertor at a first frequency during a first charging phase of the charging system;
    monitoring a power output value of the power convertor during the first charging phase of the charging system;
    ending the first charging phase upon determining that the power output value of the power convertor has dropped below a threshold value; and
    subsequent to ending the first charging phase, operating the power convertor at a second frequency during a second charging phase of the charging system, wherein the first frequency is different than the second frequency and the first frequency is at least one of 20 percent higher than the second frequency or 20 percent lower than the second frequency.

7. The method of claim 6, wherein operation of the charging system at the first frequency at a first power output value causes audible noise at a lower level than operation of the charging system at the second frequency at the first power output value.

8. The method of claim 7, wherein the first frequency is at least one of 50 percent higher than the second frequency or 50 percent lower than the second frequency.

9. A method of charging a battery in a charging system having a power convertor that converts AC electrical power to DC electrical power, the method comprising:
    operating the power convertor at a first frequency during a first charging phase of the charging system;
    monitoring an elapsed time value measured from the time at which the first charging phase commences;
    ending the first charging phase upon determining the elapsed time value has reached a threshold value; and
    subsequent to ending the first charging phase, operating the power convertor at a second frequency during a second charging phase of the charging system, wherein the first frequency is different than the second frequency and operation of the power convertor at the first frequency at a first power output value causes audible noise at a lower level than operation of the power convertor at the second frequency at the first power output value.

10. The method of claim 9, wherein the first frequency is at least one of 20 percent higher than the second frequency or 20 percent lower than the second frequency.

11. The method of claim 9, wherein the first frequency is at least one of 50 percent higher than the second frequency or 50 percent lower than the second frequency.

* * * * *